US012793416B2

(12) United States Patent
Shi et al.

(10) Patent No.: US 12,793,416 B2
(45) Date of Patent: Nov. 10, 2026

(54) APPARATUS FOR IDENTIFYING ITEMS, METHOD FOR IDENTIFYING ITEMS AND ELECTRONIC DEVICE

(71) Applicant: Fujitsu Limited, Kawasaki (JP)

(72) Inventors: Ziqiang Shi, Beijing (CN); Liu Liu, Beijing (CN); Zhongling Liu, Beijing (CN); Rujie Liu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 191 days.

(21) Appl. No.: 18/618,134

(22) Filed: Mar. 27, 2024

(65) Prior Publication Data

US 2024/0331378 A1 Oct. 3, 2024

(30) Foreign Application Priority Data

Mar. 29, 2023 (CN) ......................... 202310325584.9

(51) Int. Cl.

| | |
|---|---|
| ***G06V 20/40*** | (2022.01) |
| ***G06T 7/12*** | (2017.01) |
| ***G06T 7/13*** | (2017.01) |
| ***G06T 7/246*** | (2017.01) |
| ***G06T 7/277*** | (2017.01) |
| ***G06V 10/26*** | (2022.01) |

(Continued)

(52) U.S. Cl.

CPC ................ *G06V 20/41* (2022.01); *G06T 7/12* (2017.01); *G06T 7/13* (2017.01); *G06T 7/248* (2017.01); *G06T 7/277* (2017.01); *G06V 10/26* (2022.01); *G06V 10/44* (2022.01); *G06V 10/751* (2022.01); *G06V 20/49* (2022.01); *G06T 2207/10016* (2013.01); *G06T 2207/20132* (2013.01)

(58) Field of Classification Search

None

See application file for complete search history.

(56) References Cited

U.S. PATENT DOCUMENTS

2019/0005343 A1* 1/2019 Srivastava ........... G06V 10/809
2021/0397844 A1* 12/2021 Zou ........................... G06T 7/50

(Continued)

OTHER PUBLICATIONS

A. Keivani, J.-R. Tapamo and F. Ghayoor, "Motion-based moving object detection and tracking using automatic K-means," 2017 IEEE AFRICON, Cape Town, South Africa, 2017, pp. 32-37, doi: 10.1109/AFRCON.2017.8095451. (Year: 2017).*

(Continued)

*Primary Examiner* — SJ Park
*Assistant Examiner* — Caroline E. Depalma
(74) *Attorney, Agent, or Firm* — XSENSUS LLP

(57) ABSTRACT

The embodiments of the present disclosure provide an apparatus for identifying items, a method for identifying items and an electronic device. The apparatus includes: a detector configured to detect one or more items in a reference area in one or more image frames in video data; a tracker configured to track an item detected in multiple image frames, wherein multi-hierarchy decision is performed on the item in the multiple image frames by using different time windows; and a classifier configured to identify the item according to a decision result of the tracker. Thereby, even if an item is moved briefly in some scenarios, the item will not be identified as two different items, which can reduce a situation in which the item is identified repeatedly and improve accuracy and robustness of item detection.

16 Claims, 10 Drawing Sheets

(51) Int. Cl.
*G06V 10/44* (2022.01)
*G06V 10/75* (2022.01)

(56) References Cited

U.S. PATENT DOCUMENTS

2022/0405587 A1* 12/2022 Rangarajan .......... G06V 10/771
2023/0360360 A1* 11/2023 Öhrn ...................... G06V 10/40

OTHER PUBLICATIONS

Zhang, Yicheng, and Qiang Ling. "Bicycle detection based on multi-feature and multi-frame fusion in low-resolution traffic videos." arXiv preprint arXiv:1706.03309 (2017). (Year: 2017).*

Extended European Search Report issued Jul. 12, 2024 in corresponding European Patent Application No. 24166777.3, 7 pages.

Zhang Yicheng et al., "Bicycle Detection Based On Multi-feature and Multi-frame Fusion in low-resolution traffic videos", arXiv, Jun. 11, 2017, XP93179423A.

European Communication pursuant to Article 94(3) EPC issued Sep. 18, 2026 in corresponding European Patent Application No. 24 166 777.3, 6 pages.

Nicolai Wojke et al: "Simple Online and Realtime Tracking with a Deep Association Metric", arxiv.org Cornell University Library, 201 Olin Library Cornell University Ithaca, NY 14853, Mar. 21, 2017 (Mar. 21, 2017), pp. 1-5, XP080758706, DOI: 10.1109/ICIP.2017.8296962.

* cited by examiner

APPARATUS FOR IDENTIFYING ITEMS, METHOD FOR IDENTIFYING ITEMS AND ELECTRONIC DEVICE

TECHNICAL FIELD

The embodiments of the present disclosure relate to the video detection technical field.

BACKGROUND

Currently, items may be detected using video data. For example, in an unattended supermarket, a customer can achieve automatic self-checkout by placing items in a camera area and having the items identified by a camera device. Compared to a self-checkout mode using barcodes, a self-checkout mode based on video data is faster, and a fraud detection problem due to intentional mislabeling of a barcode will not occur.

It should be noted that the above introduction to the technical background is just to facilitate a clear and complete description of the technical solutions of the present disclosure, and is elaborated to facilitate the understanding of persons skilled in the art, it cannot be considered that these technical solutions are known by persons skilled in the art just because these solutions are elaborated in the Background of the present disclosure.

SUMMARY

However, the inventor finds: currently, an item detection scheme based on video data still needs to improve the detection accuracy. For example, in some scenarios, an item may be moved briefly and identified as two different items, resulting in a problem that the item is identified repeatedly.

For at least one of said technical problems, the embodiments of the present disclosure provide an apparatus for identifying items, a method for identifying items and an electronic device.

According to one aspect of the embodiments of the present disclosure, an apparatus for identifying items is provided, including:

- a detector configured to detect one or more items in a reference area in one or more image frames in video data;
- a tracker configured to track an item detected in multiple image frames, wherein multi-hierarchy decision is performed on the item in the multiple image frames by using different time windows; and
- a classifier configured to identify the item according to a decision result of the tracker.

According to another aspect of the embodiments of the present disclosure, a method for identifying items is provided, including:

- detecting one or more items in a reference area in one or more image frames in video data;
- tracking an item detected in multiple image frames, wherein multi-hierarchy decision is performed on the item in the multiple image frames by using different time windows; and
- identifying the item according to a decision result.

According to another aspect of the embodiments of the present disclosure, an electronic device is provided, including a memory and a processor, the memory storing a computer program, the processor being configured to execute the computer program to carry out the method for identifying items as described above.

One of the advantageous effects of the embodiments of the present disclosure lies in: multi-hierarchy decision is performed on the item in the multiple image frames by using different time windows. Thereby, even if an item is moved briefly in some scenarios, the item will not be identified as two different items, which can reduce a situation in which the item is identified repeatedly and improve accuracy and robustness of item detection.

Referring to the later description and drawings, specific implementations of the embodiments of the present disclosure are disclosed in detail, indicating a manner that the principle of the embodiments of the present disclosure can be adopted. It should be understood that the implementations of the present disclosure are not limited in terms of the scope. Within the scope of the spirit and terms of the appended claims, the implementations of the present disclosure include many changes, modifications and equivalents.

BRIEF DESCRIPTION OF DRAWINGS

The included drawings are used to provide a further understanding on the embodiments of the present disclosure, constitute a part of the Specification, are used to illustrate the implementations of the present disclosure, and expound the principle of the present disclosure together with the text description. Obviously, the drawings in the following description are only some embodiments of the present disclosure. Persons skilled in the art can further obtain other implementations based on the drawings under the premise that they do not pay inventive labor.

In the drawings.

DETAILED DESCRIPTION

Figure 1:
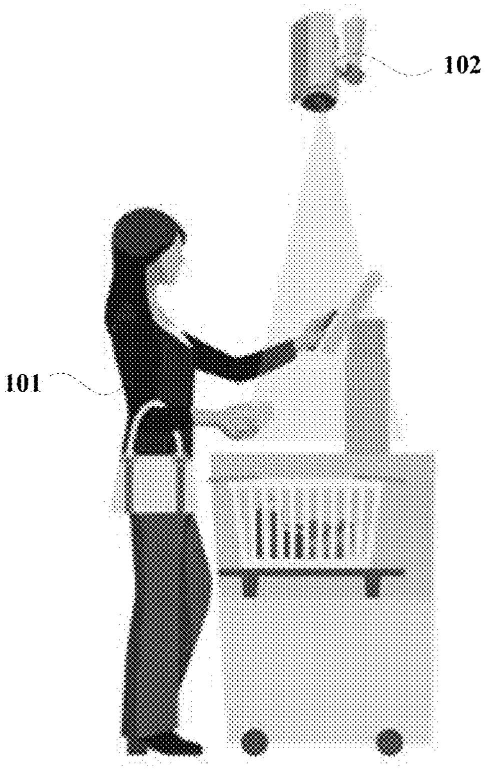
FIG. 1 is an exemplary diagram of a scenario in the embodiments of the present disclosure.

Referring to the drawings, through the following Specification, the above and other features of the embodiments of the present disclosure will become obvious. The Specification and the figures specifically disclose particular implementations of the present disclosure, showing partial implementations which can adopt the principle of the embodiments of the present disclosure. It should be understood that the present disclosure is not limited to the described implementations, on the contrary, the embodiments of the present disclosure include all the modifications, variations and equivalents falling within the scope of the attached claims.

In the embodiments of the present disclosure, the term "first" and "second", etc. are used to distinguish different elements in terms of appellation, but do not represent a spatial arrangement or time sequence, etc. of these elements, and these elements should not be limited by these terms. The term "and/or" includes any and all combinations of one or more of the associated listed terms. The terms "include", "comprise" and "have", etc. refer to the presence of stated features, elements, members or components, but do not preclude the presence or addition of one or more other features, elements, members or components.

In the embodiments of the present disclosure, the singular forms "a/an" and "the", etc. include plural forms, and should be understood broadly as "a kind of" or "a type of", but are not defined as the meaning of "one"; in addition, the term "the" should be understood to include both the singular forms and the plural forms, unless the context clearly indicates otherwise. In addition, the term "according to" should be understood as "at least partially according to . . . ", the term "based on" should be understood as "at least partially based on . . . ", unless the context clearly indicates otherwise.

Features that are described and/or illustrated with respect to one implementation may be used in the same way or in a similar way in one or more other implementations and in combination with or instead of the features in the other implementations. The term "comprise/include" when being used herein refers to the presence of a feature, a whole piece, a step or a component, but does not exclude the presence or addition of one or more other features, whole pieces, steps or components.

Figure 2:
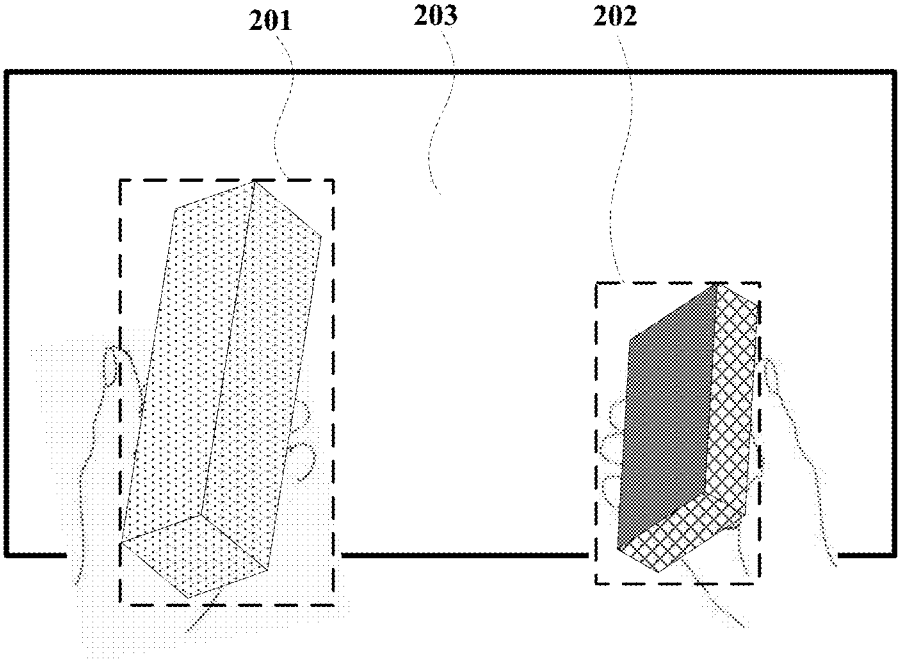
FIG. 2 is an exemplary diagram of identifying an item under the scenario in FIG. 1.

FIG. 1 is an exemplary diagram of a scenario in the embodiments of the present disclosure. FIG. 2 is an exemplary diagram of identifying an item under the scenario in FIG. 1. By taking self-checkout in a supermarket as an example, as shown in FIG. 1 and FIG. 2, a customer 101 may place commodities that need to be checked out in a reference area (tray 203 as shown in FIG. 2), a camera 102 detects items in the reference area and identify these commodities. For example, as shown in FIG. 2, chocolate in a tracklet 201 and black tea in a tracklet 202 may be identified.

The inventor finds: currently, an item detection scheme based on video data still needs to improve the detection accuracy. For example, in some scenarios, an item may be moved briefly and identified as two different items.

Figure 3:
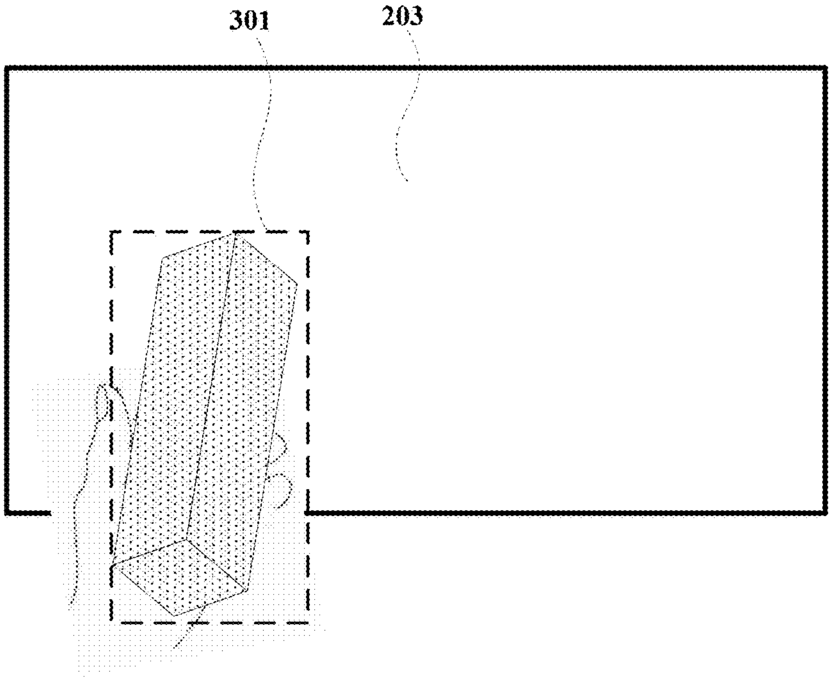
FIG. 3 is an exemplary diagram of an image frame when an item is identified.

FIG. 3 is an exemplary diagram of an image frame when an item is identified. As shown in FIG. 3, at this moment, the customer puts item 1 (chocolate) into the tray with his/her left hand, and the item 1 is identified as a box of chocolates (as shown by 301 in FIG. 3).

Figure 4:
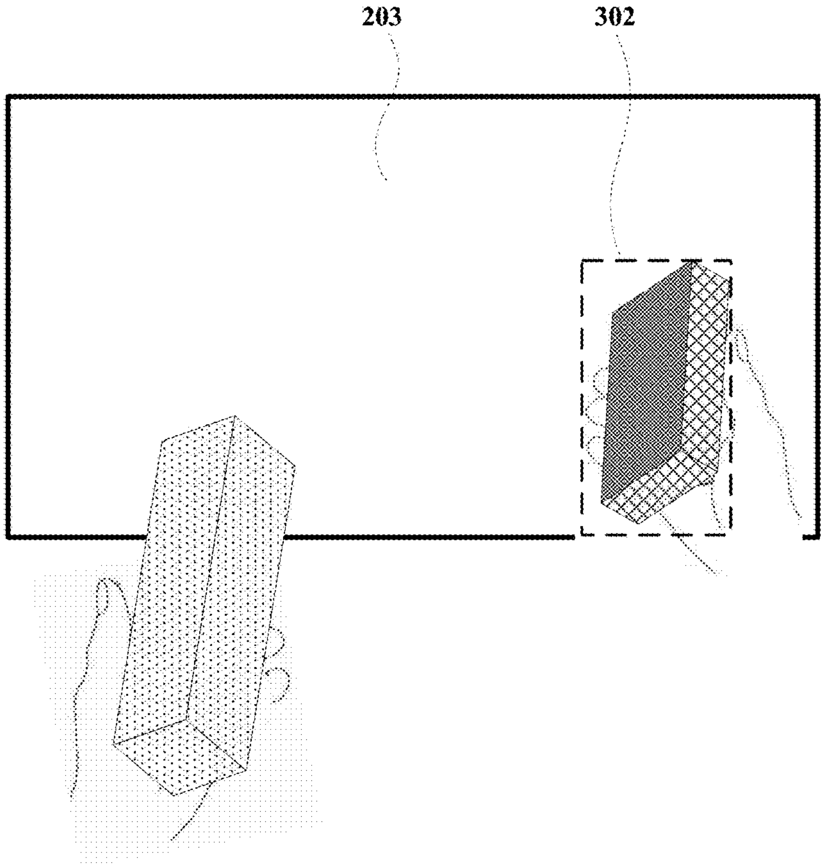
FIG. 4 is an exemplary diagram of another image frame when an item is identified.

FIG. 4 is an exemplary diagram of another image frame when an item is identified. As shown in FIG. 4, at this moment, the customer removes part of item 1 (chocolate) from the tray with his/her left hand and puts item 2 (black tea) into the tray with his/her right hand, and the item 2 is identified as a box of black tea (as shown by 302 in FIG. 4).

Figure 5:
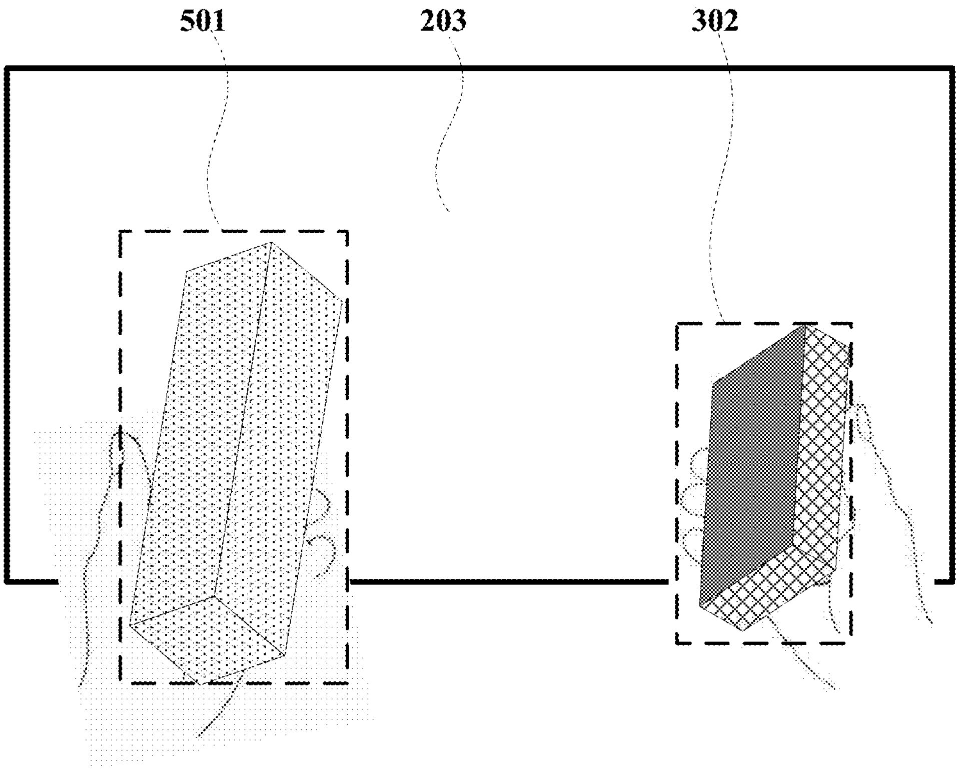
FIG. 5 is an exemplary diagram of another image frame when an item is identified.

FIG. 5 is an exemplary diagram of another image frame when an item is identified. As shown in FIG. 5, at this moment, the customer moves part of item 1 (chocolate) back into the tray with his/her left hand, and keeps item 2 (black tea) still in the tray with his/her right hand, the item 1 is identified as another box of chocolates (as shown by 501 in FIG. 5), and the item 2 is identified as a box of black tea (as shown by 302 in FIG. 5).

That is, items to be checked out by this customer should be a box of chocolates and a box of black tea, however they might be identified as two boxes of chocolates and a box of black tea, so a problem that an item is identified repeatedly occurs. The above is only illustrative description, but the present disclosure is not limited to this. For example, for the sake of simplicity, FIG. 2 to FIG. 5 only schematically show a tray, and do not show its image feature. The reference area in the present disclosure may have specific image features (such as color, texture, etc.).

In addition, there is still a problem of low accuracy in current item identification schemes, such as missing detection and wrong detection. The inventor finds that a reason for the missing detection or wrong detection is at least partly due to inconsistency between a training sample and an actual detection scenario.

The embodiments of the present disclosure make improvements for at least one of the above problems. In the embodiments of the present disclosure, items as detection targets may be various commodities in a supermarket, such as general merchandises, vegetables, fruits, etc., and may also be any other to-be-detected items, and the embodiments of the present disclosure are not limited to these. The reference area (or reference item) may be a fixed desktop, a bracket, etc., or may also be an active tray, etc.

Embodiments of a First Aspect

Figure 6:
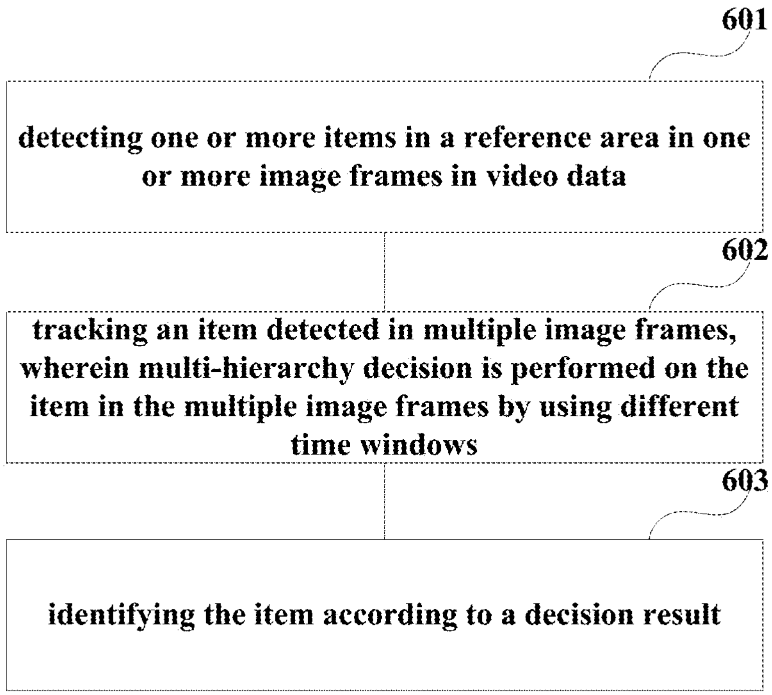
FIG. 6 is a schematic diagram of a method for identifying items in the embodiments of the present disclosure.

The embodiments of the present disclosure provide a method for identifying items. FIG. 6 is a schematic diagram of a method for identifying items in the embodiments of the present disclosure, as shown in FIG. 6, the method includes:

601, detecting one or more items in a reference area in one or more image frames in video data;

602, tracking an item detected in multiple image frames, wherein multi-hierarchy decision is performed on the item in the multiple image frames by using different time windows; and

603, identifying the item according to a decision result.

It should be noted that the above FIG. 6 only schematically describes the embodiments of the present disclosure, but the present disclosure is not limited to this. For example, an execution order of each operation may be adjusted appropriately, moreover other some operations may be increased or reduced. Persons skilled in the art may make appropriate modifications according to the above contents, not limited to the records in the above FIG. 6.

In the embodiments of the present disclosure, multi-hierarchy decision is performed on the item in the multiple image frames by using different time windows, including:

performing first hierarchy decision using a first time window, and performing second hierarchy decision using a second time window, wherein the first time window is smaller than the second time window. Or, multi-hierarchy decision is performed on the item in the multiple image frames by using different time windows, including: performing decision hierarchy by hierarchy in a bottom-up sequence from a short window to a long window.

Figure 7:
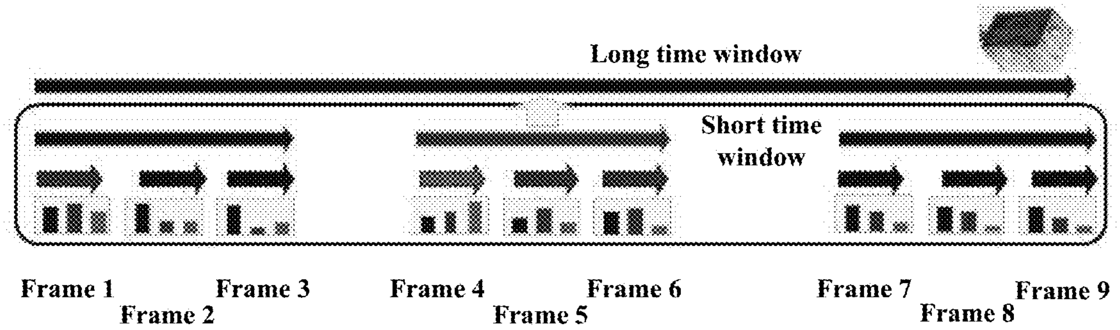
FIG. 7 is an exemplary diagram of multi-hierarchy decision in the embodiments of the present disclosure.

FIG. 7 is an exemplary diagram of multi-hierarchy decision in the embodiments of the present disclosure. As shown in FIG. 7, decision may be performed on items in 9 frames (frame 1 to frame 9). For example, at the time of a frame level, according to a degree of confidence, the items in 9 frames may be decided to be a soup box, a chocolate box, a chocolate box, a black tea box, a soup box, a soup box, a chocolate box, a chocolate box, and a chocolate box, respectively.

At the time of a short time window (3 frames being a short time window) level, decision is performed again on the items according to a decision result of the frame level. For example, for the first 3 frames, the decision result at the time of the frame level is a soup box, a chocolate box, a chocolate box, and it is decided to be a chocolate box at the time of the short time window level; for the middle 3 frames, the decision result at the time of the frame level is a black tea box, a soup box, a soup box, and it is decided to be a soup box at the time of the short time window level; for the last 3 frames, the decision result at the time of the frame level is a chocolate box, a chocolate box, and a chocolate box, and it is decided to be a chocolate box at the time of the short time window level.

At the time of a long time window (9 frames being a long time window) level, decision is performed again on the items according to a decision result of the short time window level. For example, a decision result of the short time window is a chocolate box, a soup box, a chocolate box, respectively, then it is decided to be a chocolate box at the time of the long time window level.

Thereby, multi-hierarchy (from bottom to top) decision is performed on the item in the multiple image frames by using different time windows. Even if an item is moved briefly in some scenarios, the item will not be identified as two different items, which may reduce a situation in which the item is identified repeatedly and improve accuracy and robustness of item detection.

In some embodiments, image frames in the video data may be preprocessed; wherein at least a part of outer edge areas of the detected item is segmented and removed, and the removed areas are filled with the reference area.

Figure 8:
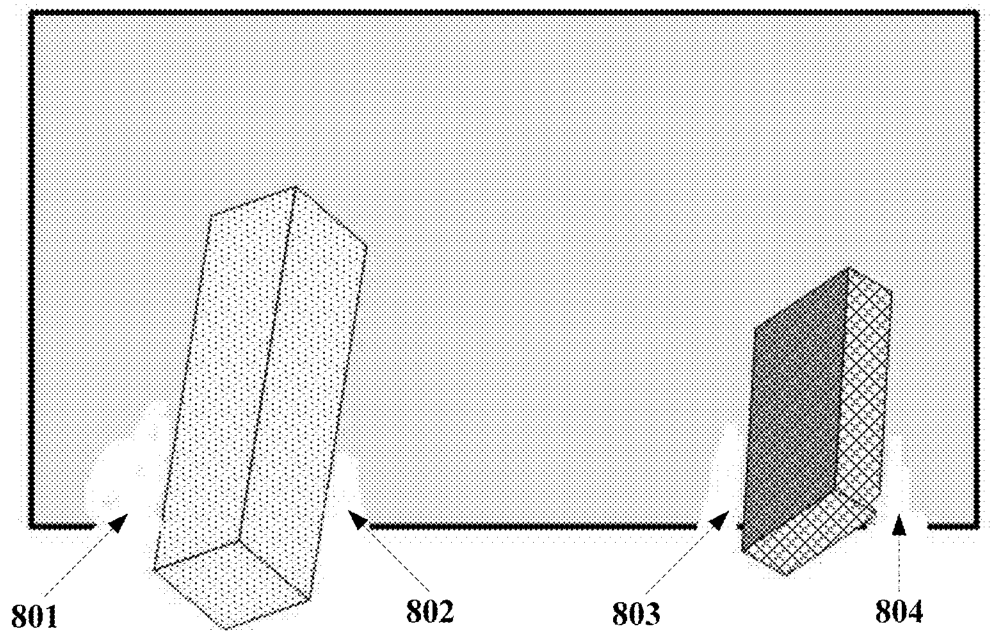
FIG. 8 is an exemplary diagram of pre-processing in the embodiments of the present disclosure.
Figure 9:
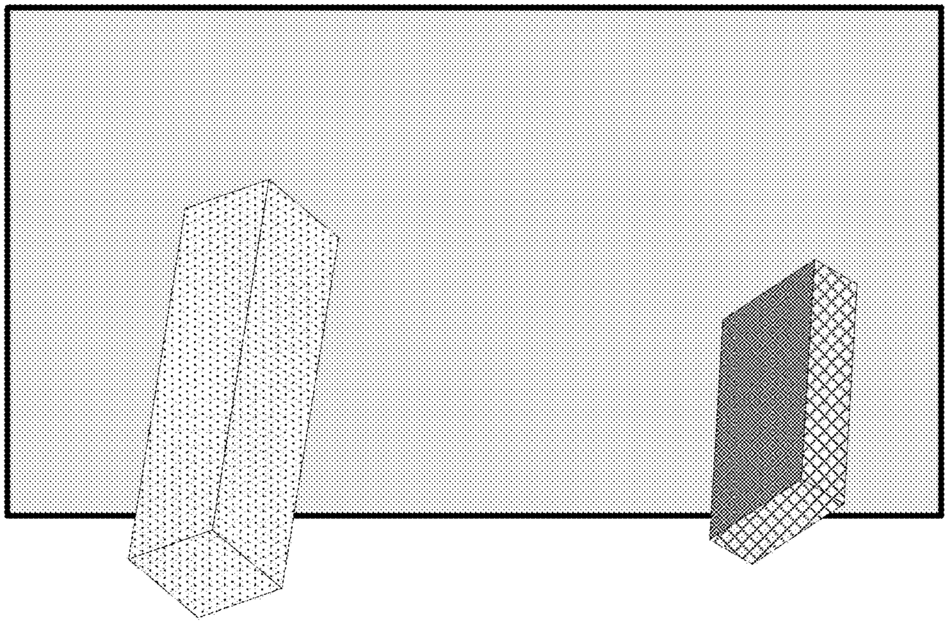
FIG. 9 is another exemplary diagram of pre-processing in the embodiments of the present disclosure.

FIG. 8 is an exemplary diagram of pre-processing in the embodiments of the present disclosure, FIG. 9 is another exemplary diagram of pre-processing in the embodiments of the present disclosure. As shown in FIG. 8, for example, an area where "a hand" is located in the image may be segmented and removed (as shown by 801 to 804 in FIG. 8), and then, as shown in FIG. 9, the removed area is filled with one or more pixels (or color, texture feature, etc.) of a tray.

Thereby, since the feature of the reference area is relatively fixed and synthesized into a training sample, adding the feature of the reference area as much as possible in an actual detection image may improve a matching degree between the actual detection image and the training sample, reduce or even avoid missing detection or wrong detection, and further improve the accuracy of item identification.

In some embodiments, the tracker maintains a dynamic surface feature sequence for a tracklet, a distance between any two features in the surface feature sequence being greater than a preset threshold.

For example, generally, features are added sequentially for each tracklet, and a relatively long surface feature sequence (such as 100 features) will be maintained, and a long time will be consumed when the features are compared. In the embodiments of the present disclosure, a dynamic surface feature sequence for a tracklet is maintained, i.e., features to be added to the surface feature sequence are screened, only a feature with a larger distance from a current feature in the surface feature sequence (i.e. a feature distance being greater than a threshold) may be added into the surface feature sequence.

Thereby, the number of features in the dynamic surface feature sequence is not too many, which may reduce the time at the time of feature comparison, and even if a feature with a smaller feature distance is not added into the sequence, an identification result will not be affected too much, and identification accuracy will not be reduced.

In some embodiments, at least one piece of the following post-processing on the tracking result may be performed: deleting a tracklet with a track length less than a preset threshold, deleting a tracklet classified as a background, splitting a tracklet, or merging multiple tracklets with identical identifiers into one tracklet.

Figure 10:
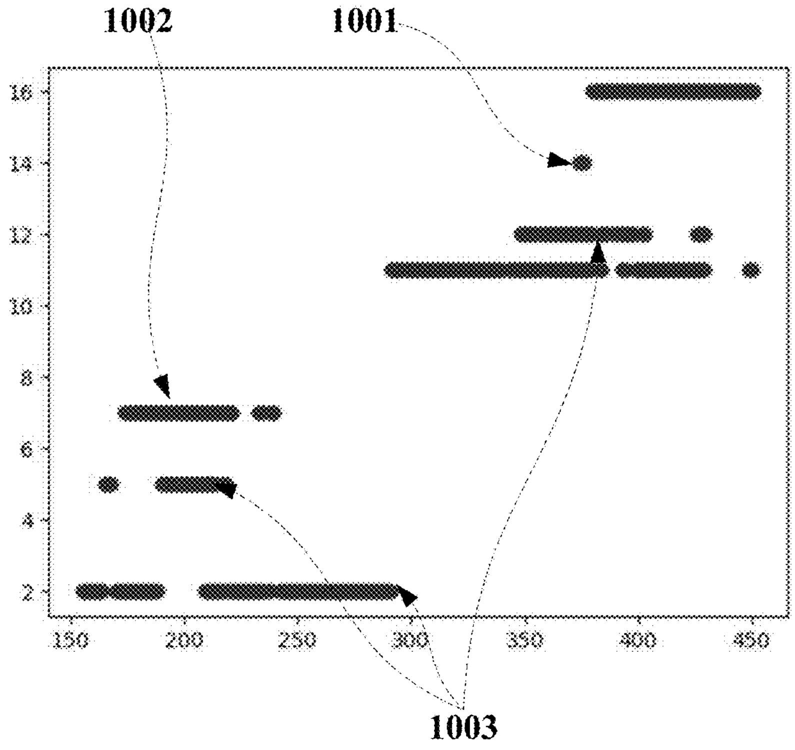
FIG. 10 is an exemplary diagram of post-processing in the embodiments of the present disclosure.
Figure 11:
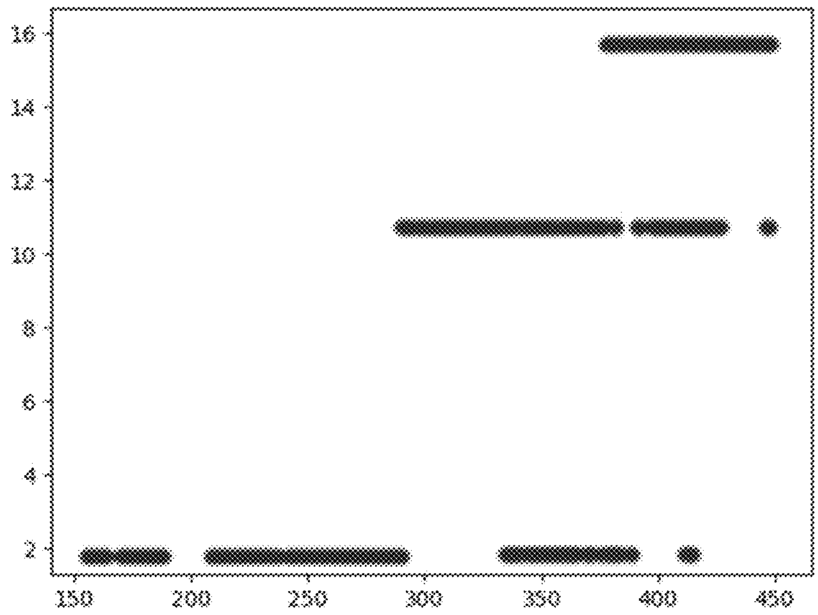
FIG. 11 is another exemplary diagram of post-processing in the embodiments of the present disclosure.

FIG. 10 is an exemplary diagram of post-processing in the embodiments of the present disclosure, showing a situation before post-processing. FIG. 11 is another exemplary diagram of post-processing in the embodiments of the present disclosure, showing a situation after post-processing. For example, a tracklet level may be optimized through a voting scheme.

As shown in FIG. 10 and FIG. 11, for example, for a track shown by 1001, the track length is small and may be judged as noise, so a tracklet corresponding to the track may be deleted; for a track shown by 1002, the track is determined as a background, so a tracklet corresponding to the track may be deleted; for three tracks shown by 1003, IDs of the three tracks are identical, so tracklets corresponding to these tracks may be merged.

Thereby, accuracy and robustness of item identification may be further improved by using post-processing.

In some embodiments, the tracker processes a center and proportion of a tracklet by using separate Kalman filters, wherein linear Kalman filtering is performed on the center of the tracklet, and nonlinear Kalman filtering is performed on the proportion of the tracklet.

Figure 12:
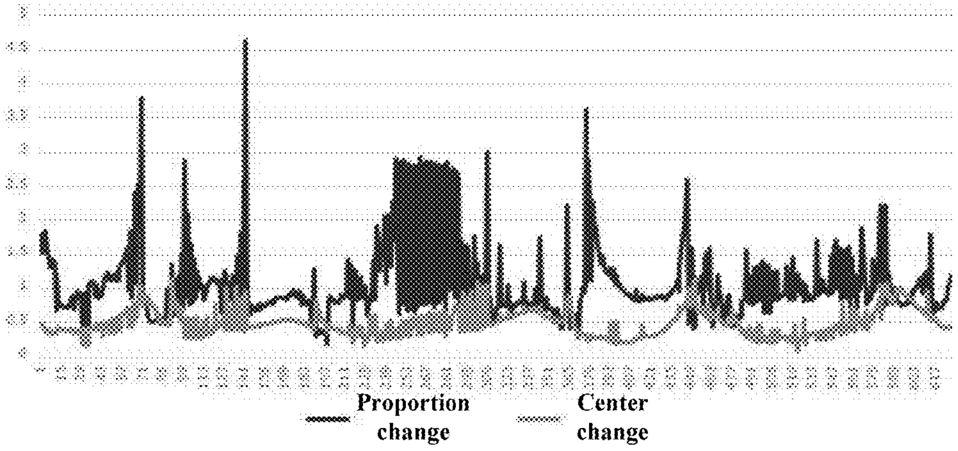
FIG. 12 is an exemplary diagram of a change pattern of a center and proportion of a tracklet in the embodiments of the present disclosure.

FIG. 12 is an exemplary diagram of a change pattern of a center and proportion of a tracklet in the embodiments of the present disclosure. As shown in FIG. 12, a change of a center point of the item is generally more smooth, but a change of a proportion of the item (such as a depth-width ratio or an area ratio or a horizontal-vertical ratio) is generally more drastic.

Thereby, a center and proportion of a tracklet are processed by using separate Kalman filters, which may further improve accuracy and robustness of item identification.

The above is a schematic description of the item identification in the present disclosure. The above each embodiment may be separately implemented respectively or may be combined arbitrarily. A training process or training sample in the embodiments of the present disclosure is described below. The training process (or registration process) in the embodiments of the present disclosure may precede an actual item identification process, or the training process and the identification process may be carried out simultaneously.

In some embodiments, image synthesis on one or more items and the reference area may be performed; and the synthesized image is cropped to form one or more detection samples for use in training.

Figure 13:
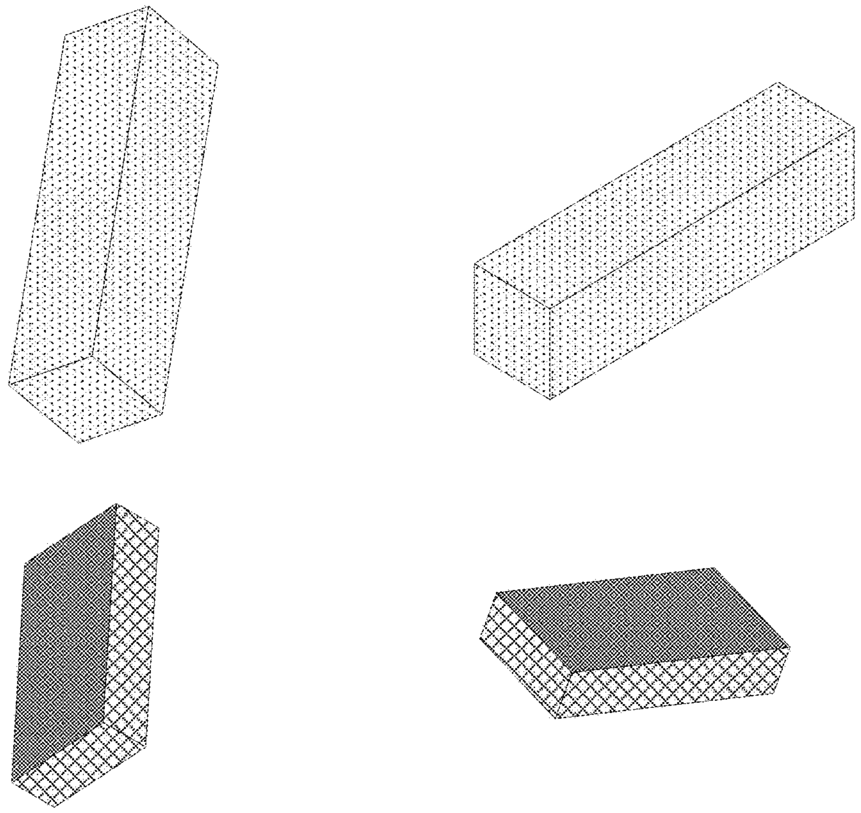
FIG. 13 is an exemplary diagram of an item training set in the embodiments of the present disclosure.

FIG. 13 is an exemplary diagram of an item training set in the embodiments of the present disclosure. As shown in FIG. 13, an item training set may be prepared in advance, and images of an item from various perspectives are used as training samples. As shown in FIG. 13, after the item is photographed from various perspectives, the obtained images may be put into the training set.

Figure 14:
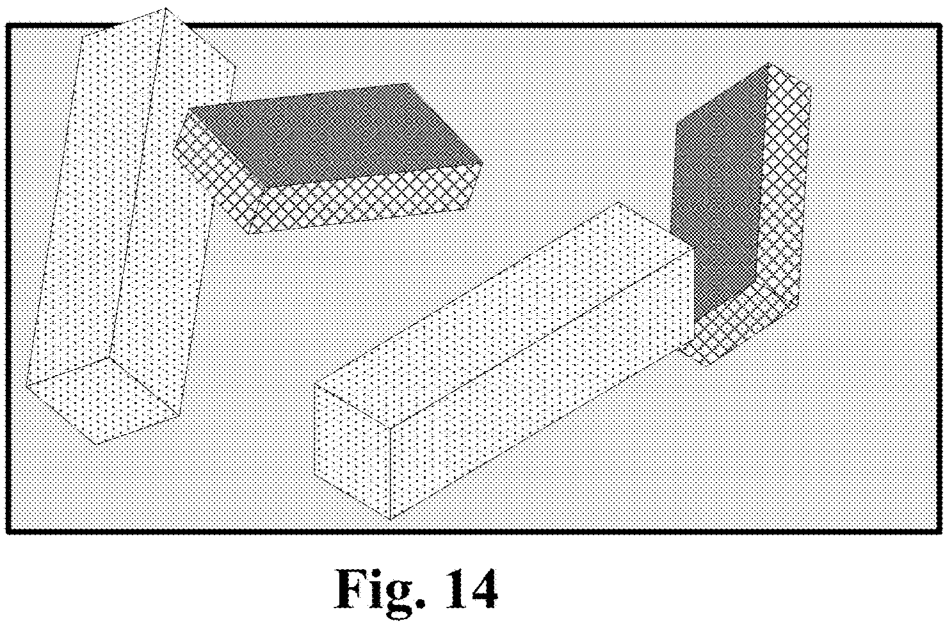
FIG. 14 is an exemplary diagram of image synthesis in the embodiments of the present disclosure.

FIG. 14 is an exemplary diagram of image synthesis in the embodiments of the present disclosure. As shown in FIG. 14, for example, an item may be placed in a tray (reference area) for photographing. For example, multiple items may be placed in the reference area, and the items may overlap each other.

Figure 15:
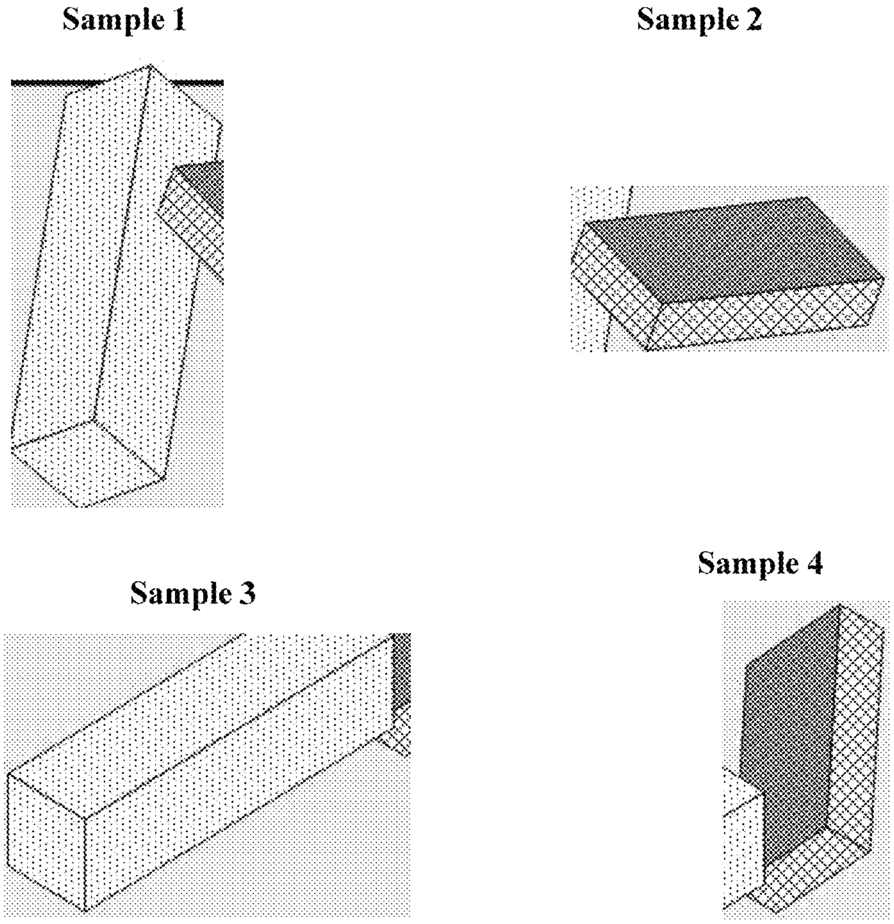
FIG. 15 is an exemplary diagram of image cropping in the embodiments of the present disclosure.

FIG. 15 is an exemplary diagram of image cropping in the embodiments of the present disclosure. As shown in FIG. 15, for example, the synthesized image may be cropped into multiple detection samples for use in training. For example, as shown in FIG. 15, in samples 1 to 4, image features of the reference area may be included, which may reflect overlapping, multiple perspectives, etc.

Thereby, the training sample includes the reference area at the time of the actual item identification by performing image synthesis on the item and the reference area. Therefore, it enables the training sample to be closer to a real scenario, reduces or even avoids missing detection or wrong detection, and further improves the accuracy and robustness of item identification.

In some embodiments, the image synthesis may be performed according to at least one of the following parameters: the number of items in the reference area, a degree of overlap or occlusion ratio of the items, or a scaling ratio of the items. The embodiments of the present disclosure are not limited to this.

For example, multiple items (such as 1 to 6 different items) may be placed in a tray, these items may overlap each other (for example, a degree of overlapping is 0.05, 0.1, 0.15, 0.2, 0.25, 0.3, etc.), moreover, the items may also be scaled up or down (for example, a scaling proportion is 0.15-0.5).

Thereby, image synthesis on items is performed according to various parameters, the training sample includes various possible situations at the time of the actual item identification. Therefore, it enables the training sample closer to a real scenario, which reduces or even avoids missing detection or wrong detection, and further improves the accuracy and robustness of item identification.

In some embodiments, at least one piece of the following processing on the one or more items may also be performed: increasing or decreasing image brightness, increasing or decreasing a degree of overlap, changing shooting perspectives of the items, or enhancing texture features of the items.

Thereby, enhancement processing is performed on an image of an item, which enables the training sample to be closer to a real scenario, reduces or even avoids missing detection or wrong detection, and further improves the accuracy and robustness of item identification.

The above only describes each step or process related to the present disclosure, but the present disclosure is not limited to this. A method for identifying items may further include other steps or processes. For specific contents of these steps or processes, please refer to relevant arts. In addition, the above only takes item identification as an example to exemplarily describe the embodiments of the present disclosure, however the present disclosure is not limited to these structures, these structures may also be modified appropriately, implementations of such modifications should be included within the scope of the embodiments of the present disclosure.

Each of the above embodiments is only illustrative for the embodiments of the present disclosure, but the present disclosure is not limited to this, appropriate modifications may be also made based on the above each embodiment. For example, each of the above embodiments may be used individually, or one or more of the above embodiments may be combined.

As can be known from the above embodiments, multi-hierarchy decision is performed on the item in the multiple image frames by using different time windows. Thereby, even if an item is moved briefly in some scenarios, the item will not be identified as two different items, which can reduce a situation in which the item is identified repeatedly and improve accuracy and robustness of item detection.

Embodiments of a Second Aspect

The embodiments of the present disclosure provide an apparatus for identifying items, the contents same as the embodiments of the first aspect are not repeated.

Figure 16:
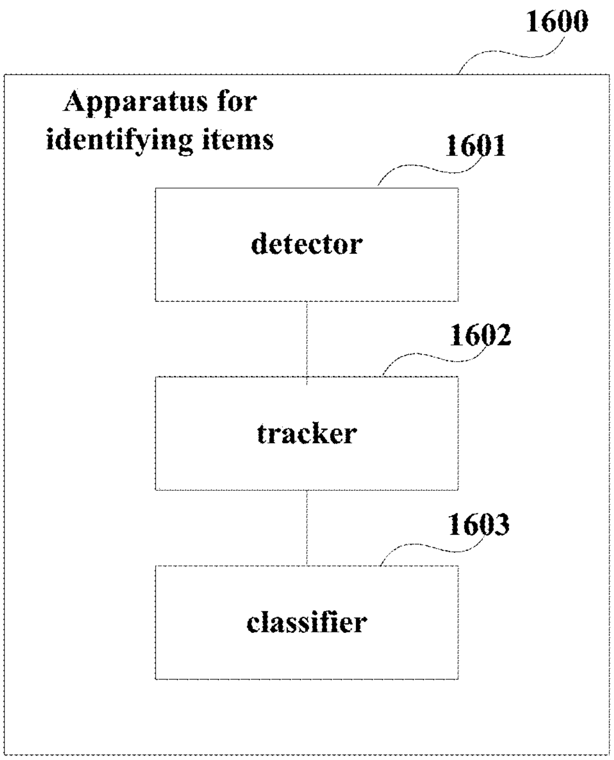
FIG. 16 is a schematic diagram of an apparatus for identifying items in the embodiments of the present disclosure.

FIG. 16 is a schematic diagram of an apparatus for identifying items in the embodiments of the present disclosure, as shown in FIG. 16, the apparatus 1600 for identifying items includes:

- a detector 1601 configured to detect one or more items in a reference area in one or more image frames in video data;
- a tracker 1602 configured to track an item detected in multiple image frames, wherein multi-hierarchy decision is performed on the item in the multiple image frames by using different time windows; and
- a classifier 1603 configured to identify the item according to a decision result of the tracker.

In some embodiments, the detector 1601 may use an OSS method and may use various relevant technologies, such as DetectRS, ResNet, ResNest, DETR, YOLO family, Efficientnet, Faster R-CNN, Mask R-CNN, etc.; the present disclosure is not limited to these.

In some embodiments, the classifier 1603 may use an OSS method and may use various relevant technologies, such as VGG, RepVGG, ResNet, ResNeSt, ResNeXt, MobileNet, ViT, Swin-Transformer, EfficientNet, ConvNeXt, etc.; the present disclosure is not limited to these.

Figure 17:
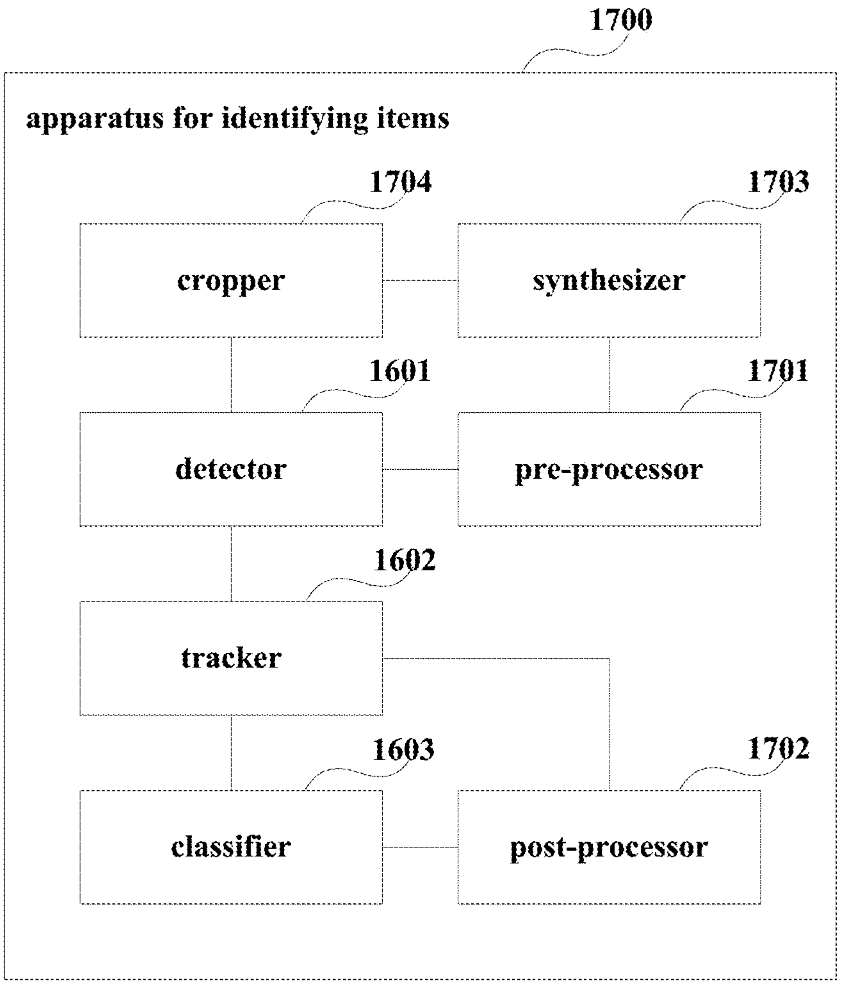
FIG. 17 is another schematic diagram of an apparatus for identifying items in the embodiments of the present disclosure.

FIG. 17 is another schematic diagram of an apparatus for identifying items in the embodiments of the present disclosure, as shown in FIG. 17, the apparatus 1700 for identifying items includes: a detector 1601, a tracker 1602 and a classifier 1603; moreover, the apparatus 1700 for identifying items may further include:

- a pre-processor 1701 configured to preprocess the image frames in the video data; wherein at least a part of outer edge areas of the detected item are segmented and removed, and the removed areas are filled with the reference area.

In some embodiments, the tracker 1602 maintains a dynamic surface feature sequence for a tracklet, a distance between any two features in the surface feature sequence being greater than a preset threshold.

In some embodiments, as shown in FIG. 17, the apparatus may further include:

- a post-processor 1702 configured to perform at least one piece of the following post-processing on the tracking result: deleting a tracklet with a track length less than a preset threshold, deleting a tracklet classified as a background, splitting a tracklet, or merging multiple tracklets with identical identifiers into one tracklet.

In some embodiments, the tracker 1602 processes a center and proportion of a tracklet by using separate Kalman filters, wherein linear Kalman filtering is performed on the center of the tracklet, and nonlinear Kalman filtering is performed on the proportion of the tracklet.

In some embodiments, as shown in FIG. 17, the apparatus may further include:

a synthesizer 1703 configured to perform image synthesis on one or more items and the reference area; and a cropper 1704 configured to crop the synthesized image to form one or more detection samples for use in training.

In some embodiments, the synthesizer 1703 performs the image synthesis according to at least one of the following parameters: the number of items in the reference area, a degree of overlap or occlusion ratio of the items, or a scaling ratio of the items.

In some embodiments, the synthesizer 1703 performs at least one piece of the following processing on the one or more items: increasing or decreasing image brightness, increasing or decreasing a degree of overlap, changing shooting perspectives of the items, or enhancing texture features of the items.

It's worth noting that the above only describes components or modules related to the present disclosure, but the present disclosure is not limited to this. The apparatus 1600 or 1700 for identifying items may further include other components or modules. For detailed contents of these components or modules, relevant technologies can be referred to.

For the sake of simplicity, FIG. 16 or FIG. 17 only exemplarily shows a connection relationship or signal direction between components or modules, however persons skilled in the art should know that various relevant technologies such as bus connection can be used. The above components or modules can be realized by a hardware facility such as a processor, a memory, etc. The embodiments of the present disclosure have no limitation to this.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

As can be known from the above embodiments, multi-hierarchy decision is performed on the item in the multiple image frames by using different time windows. Thereby, even if an item is moved briefly in some scenarios, the item will not be identified as two different items, which can reduce a situation in which the item is identified repeatedly and improve accuracy and robustness of item detection.

Embodiments of a Third Aspect

The embodiments of the present disclosure provide an electronic device, including the apparatus 1600 or 1700 for identifying items as described in the embodiments of the second aspect, whose contents are incorporated here. The electronic device may be, for example, a computer, server, a workstation, a laptop computer, a smartphone, etc.; however, the embodiments of the present disclosure are not limited to this.

Figure 18:
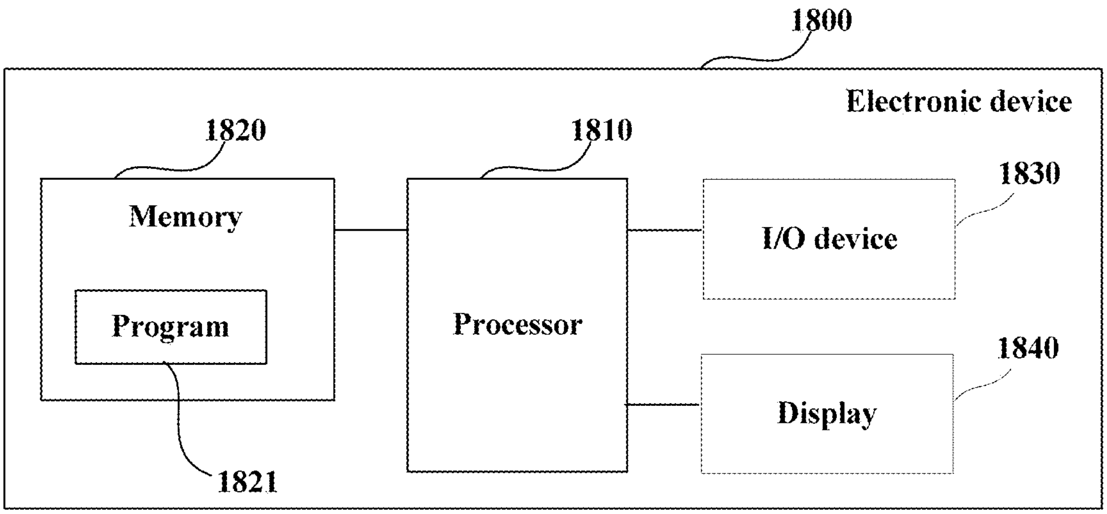
FIG. 18 is a schematic diagram of an electronic device in the embodiments of the present disclosure.

FIG. 18 is a schematic diagram of an electronic device in the embodiments of the present disclosure. As shown in FIG. 18, the electronic device 1800 may include: a processor (such as a central processing unit (CPU)) 1810 and a memory 1820; the memory 1820 is coupled to the central processing unit 1810. The memory 1820 can store various data; moreover, also stores a program 1821 for information processing, and executes the program 1821 under the control of the processor 1810.

In some embodiments, the function of the apparatus 1600 or 1700 for identifying items is integrated into the processor 1810 for implementation. The processor 1810 is configured to implement a method for identifying items as described in the embodiments of the first aspect.

In some embodiments, the apparatus 1600 or 1700 for identifying items is configured separately from the processor 1810, for example the apparatus 1600 or 1700 for identifying items is configured as a chip connected to the processor 1810, a function of the apparatus 1600 or 1700 for identifying items is realized through the control of the processor 1810.

For example, the processor 1810 is configured to perform the following control: detecting one or more items in a reference area in one or more image frames in video data; tracking an item detected in multiple image frames, wherein multi-hierarchy decision is performed on the item in the multiple image frames by using different time windows; and identifying the item according to a decision result.

In addition, as shown in FIG. 18, the electronic device 1800 may further include: an input/output (I/O) device 1830 and a display 1840, etc; wherein the functions of said components are similar to relevant arts, and are not repeated here. It's worth noting that the electronic device 1800 does not have to include all the components shown in FIG. 18. Moreover, the electronic device 1800 may also include components not shown in FIG. 18, relevant technologies may be referred to.

The embodiments of the present disclosure further provide a computer readable program, wherein when an electronic device executes the program, the program enables a computer to execute a method for identifying items as described in the embodiments of the first aspect, in the electronic device.

The embodiments of the present disclosure further provide a storage medium in which a computer readable program is stored, wherein the computer readable program enables a computer to execute a method for identifying items as described in the embodiments of the first aspect, in the electronic device.

The apparatus and method in the present disclosure can be realized by hardware, or can be realized by combining hardware with software. The present disclosure relates to such a computer readable program, when the program is executed by a logic component, the computer readable program enables the logic component to realize the apparatus described in the above text or a constituent component, or enables the logic component to realize various methods or steps described in the above text. The present disclosure also relates to a storage medium storing the program, such as a hard disk, a magnetic disk, an optical disk, a DVD, a flash memory and the like.

By combining with the method/apparatus described in the embodiments of the present disclosure, it can be directly reflected as hardware, a software executed by a processor, or a combination of the two. For example, one or more in the functional block diagram or one or more combinations in the functional block diagram as shown in the drawings may correspond to software modules of a computer program flow, and may also correspond to hardware modules. These software modules may respectively correspond to the steps as shown in the drawings. These hardware modules can be realized by solidifying these software modules e.g. using a field-programmable gate array (FPGA).

A software module can be located in a RAM memory, a flash memory, a ROM memory, an EPROM memory, an EEPROM memory, a register, a hard disk, a mobile magnetic disk, a CD-ROM or a storage medium in any other form as known in this field. A storage medium can be coupled to a processor, thereby enabling the processor to read information from the storage medium, and to write the information into the storage medium; or the storage medium can be a constituent part of the processor. The processor and the storage medium can be located in an ASIC. The software module can be stored in a memory of a mobile terminal, and may also be stored in a memory card of the mobile terminal. For example, if a device (such as the mobile terminal) adopts a MEGA-SIM card with a larger capacity or a flash memory apparatus with a large capacity, the software module can be stored in the MEGA-SIM card or the flash memory apparatus with a large capacity.

One or more in the functional block diagram or one or more combinations in the functional block diagram as described in the drawings can be implemented as a general-purpose processor for performing the functions described in the present disclosure, a digital signal processor (DSP), an application-specific integrated circuit (ASIC), a field-programmable gate array (FPGA) or other programmable logic device, discrete gate or transistor logic device, discrete hardware components or any combination thereof. One or more in the functional block diagram or one or more combinations in the functional block diagram as described in the drawings can be also implemented as a combination of computer equipments, such as a combination of a DSP and a microprocessor, a plurality of microprocessors, one or more microprocessors combined and communicating with the DSP or any other such configuration.

The present disclosure is described by combining with the specific implementations, however persons skilled in the art should clearly know that these descriptions are exemplary and do not limit the protection scope of the present disclosure. Persons skilled in the art can make various variations and modifications to the present disclosure based on the principle of the present disclosure, these variations and modifications are also within the scope of the present disclosure.

As for the implementations including the above embodiments, the following supplements are further disclosed:

Supplement 1. A method for identifying items, including:

detecting one or more items in a reference area in one or more image frames in video data;

tracking an item detected in multiple image frames, wherein multi-hierarchy decision is performed on the item in the multiple image frames by using different time windows; and identifying the item according to a decision result.

Supplement 2. The method according to Supplement 1, wherein multi-hierarchy decision is performed on the item in the multiple image frames by using different time windows, including:

performing first hierarchy decision using a first time window, and performing second hierarchy decision using a second time window, wherein the first time window is smaller than the second time window.

Supplement 3. The method according to Supplement 1 or 2, wherein multi-hierarchy decision is performed on the item in the multiple image frames by using different time windows, including:

performing decision hierarchy by hierarchy in a bottom-up sequence from a short window to a long window.

Supplement 4. The method according to any one of Supplements 1 to 3, wherein the method further includes:

preprocessing the image frames in the video data;

wherein at least a part of outer edge areas of the detected item are segmented and removed, and the removed areas are filled with the reference area.

Supplement 5. The method according to any one of Supplements 1 to 4, wherein the tracker maintains a dynamic surface feature sequence for a tracklet, a distance between any two features in the surface feature sequence being greater than a preset threshold.

Supplement 6. The method according to any one of Supplements 1 to 5, wherein the method further includes:

performing at least one piece of the following post-processing on the tracking result: deleting a tracklet with a track length less than a preset threshold, deleting a tracklet classified as a background, splitting a tracklet, or merging multiple tracklets with identical identifiers into one tracklet.

Supplement 7. The method according to any one of Supplements 1 to 6, a center and proportion of a tracklet are processed by using separate Kalman filters, wherein linear Kalman filtering is performed on the center of the tracklet, and nonlinear Kalman filtering is performed on the proportion of the tracklet.

Supplement 8. The method according to any one of Supplements 1 to 7, wherein the method further includes:

performing image synthesis on one or more items and the reference area; and cropping the synthesized image to form one or more detection samples for use in training.

Supplement 9. The method according to Supplement 8, wherein the image synthesis is performed according to at least one of the following parameters: the number of items in the reference area, a degree of overlap or occlusion ratio of the items, or a scaling ratio of the items.

Supplement 10. The method according to Supplement 8, wherein at least one piece of the following processing is performed on the one or more items: increasing or decreasing image brightness, increasing or decreasing a degree of overlap, changing shooting perspectives of the items, or enhancing texture features of the items.

Supplement 11. A storage medium storing a computer readable program, wherein the computer readable program enables a computer to execute a method for identifying items according to any one of Supplements 1 to 10, in an electronic device.

The invention claimed is:

1. An apparatus for identifying items, characterized in that the apparatus comprises:

a processor coupled to a memory and configured to, detect one or more items in a reference area in one or more image frames in video data;

track an item detected in multiple image frames, wherein multi-hierarchy decision is performed on the item in the multiple image frames by using different time windows; and identify the item according to a decision result of tracking;

wherein the processor is configured to process a center and proportion of a tracklet by using separate Kalman filters, wherein linear Kalman filtering is performed on the center of the tracklet, and nonlinear Kalman filtering is performed on the proportion of the tracklet.

2. The apparatus according to claim 1, wherein the processor is configured to preprocess the image frames in the video data;

wherein at least a part of outer edge areas of the detected item are segmented and removed, and the removed areas are filled with the reference area.

3. The apparatus according to claim 1, wherein the tracker is configured to maintain a dynamic surface feature sequence for a tracklet, a distance between any two features in the surface feature sequence being greater than a preset threshold.

4. The apparatus according to claim 1, wherein the apparatus further comprises:

the processor is configured to perform at least one piece of the following post-processing on the tracking result: deleting a tracklet with a track length less than a preset threshold, deleting a tracklet classified as a background, splitting a tracklet, or merging multiple tracklets with identical identifiers into one tracklet.

5. The apparatus according to claim 1, wherein the processor is configured to:

perform image synthesis on one or more items and the reference area; and crop the synthesized image to form one or more detection samples for use in training.

6. The apparatus according to claim 5, wherein the processor is configured to perform the image synthesis according to at least one of the following parameters: the number of items in the reference area, a degree of overlap or occlusion ratio of the items, or a scaling ratio of the items.

7. The apparatus according to claim 5, wherein the processor is configured to perform at least one piece of the following processing on the one or more items: increasing or decreasing image brightness, increasing or decreasing a degree of overlap, changing shooting perspectives of the items, or enhancing texture features of the items.

8. A method for identifying items, characterized in that the method comprises:

detecting one or more items in a reference area in one or more image frames in video data;

tracking an item detected in multiple image frames, wherein multi-hierarchy decision is performed on the item in the multiple image frames by using different time windows; and identifying the item according to a decision result;

wherein, a center and proportion of a tracklet is processed by using separate Kalman filters, wherein linear Kalman filtering is performed on the center of the tracklet, and nonlinear Kalman filtering is performed on the proportion of the tracklet.

9. An electronic device, comprising a memory and a processor, the memory storing a computer program, characterized in that the processor is configured to execute the computer program to carry out the method for identifying items as claimed in claim 8.

10. An apparatus for identifying items, the apparatus comprising:

circuitry configured to detect one or more items in a reference area in one or more image frames in video data;

track an item detected in multiple image frames, wherein multi-hierarchy decision is performed on the item in the multiple image frames by using different time windows; and identify the item according to a decision result of tracking;

wherein the circuitry is configured to process a center and proportion of a tracklet by using separate Kalman filters, wherein linear Kalman filtering is performed on the center of the tracklet, and nonlinear Kalman filtering is performed on the proportion of the tracklet.

11. The apparatus according to claim 10, wherein the circuitry is configured to preprocess the image frames in the video data;

wherein at least a part of outer edge areas of the detected item are segmented and removed, and the removed areas are filled with the reference area.

12. The apparatus according to claim 10, wherein the circuitry is configured to maintain a dynamic surface feature sequence for a tracklet, a distance between any two features in the surface feature sequence being greater than a preset threshold.

13. The apparatus according to claim 10, wherein the circuitry is configured to perform at least one piece of the following post-processing on the tracking result:

deleting a tracklet with a track length less than a preset threshold, deleting a tracklet classified as a background, splitting a tracklet, or merging multiple tracklets with identical identifiers into one tracklet.

14. The apparatus according to claim 10, wherein the circuitry is configured to:

perform image synthesis on one or more items and the reference area; and crop the synthesized image to form one or more detection samples for use in training.

15. The apparatus according to claim 14, wherein the circuitry is configured to perform the image synthesis according to at least one of the following parameters:

the number of items in the reference area, a degree of overlap or occlusion ratio of the items, or a scaling ratio of the items.

16. The apparatus according to claim 14, wherein the circuitry is configured to perform at least one piece of the following processing on the one or more items:

increasing or decreasing image brightness, increasing or decreasing a degree of overlap, changing shooting perspectives of the items, or enhancing texture features of the items.

* * * * *